United States Patent [19]
Pratt

[11] Patent Number: 5,983,450
[45] Date of Patent: Nov. 16, 1999

[54] THROUGH-WALL BUSHING

[75] Inventor: Randy L. Pratt, Salem, Va.

[73] Assignee: Salem Vent International, Inc., Salem, Va.

[21] Appl. No.: 09/190,896

[22] Filed: Nov. 12, 1998

[51] Int. Cl.[6] .............................. F16L 5/00; H02G 3/22
[52] U.S. Cl. ............................................. 16/2.1; 411/311
[58] Field of Search ................................... 411/310, 311; 16/2.1, 2.4

[56] References Cited

U.S. PATENT DOCUMENTS

| | | | |
|---|---|---|---|
| 663,049 | 12/1900 | Staiger | 16/2.4 |
| 2,741,288 | 4/1956 | Johnson | 411/311 |
| 2,788,045 | 4/1957 | Rosan | 411/311 |
| 3,176,746 | 4/1965 | Walton | 411/311 |
| 4,475,858 | 10/1984 | Benjamin et al. | 411/304 |
| 4,896,391 | 1/1990 | Rowley | 407/906 |

FOREIGN PATENT DOCUMENTS

| | | | |
|---|---|---|---|
| 3920678 | 1/1991 | Germany | 411/310 |

*Primary Examiner*—Chuck Y. Mah
*Assistant Examiner*—Donald M. Gurley
*Attorney, Agent, or Firm*—Dority & Manning

[57] ABSTRACT

A through-wall bushing defines a protected passage through a wall or similar structure, and includes a first member having an axially extending threaded portion. A second ring member is threaded onto the first member and clamps the wall structure between opposing flanges of the first member and second ring member. At least one friction inducing locking mechanism is configured on at least one of the threaded surfaces of either the first or second member, or both members. This friction inducing locking mechanism has a configuration that increases the degree of torque required to tighten and loosen the respective members upon the threads engaging the locking mechanism. The locking mechanism has a shape so that, once engaged with opposite threads, the torque required to loosen the members is greater than the torque required to further tighten the members.

10 Claims, 4 Drawing Sheets

THROUGH-WALL BUSHING

BACKGROUND OF THE INVENTION

The present invention relates to through-wall bushings wherein a protected passage is defined through a wall or compartment for cables, pipes, and the like.

Through-wall bushings are well known in the art for providing a protected passageway for cables, wires, and any other device that must pass through a wall or other structure. Typically, these bushings comprise separate members that fit into an opening or hole defined in the wall and which clamp onto opposite sides of the wall. In one conventional embodiment of such a bushing, the separate members are threaded together and are thus threadedly tightened onto the wall structure to clamp the wall structure between opposing flanges. The male member of the pair defines the protected passageway and the other member is typically a ring member that is threadedly engaged onto the male member.

It is desirable that such bushings be used for wall structures having various thicknesses so that separate bushings need not be provided for each different wall structure. In other words, the bushings should be versatile enough to be used on varying thickness wall structures. In this regard, conventional threaded bushings are axially adjustable at least along the length of their engaging threaded portions. However, with such conventional devices, an external means or device must be provided to ensure that the bushing remains tightened relative to the wall structure and that the members will not disengage or loosen due to vibration, and the like. These external locking devices are cumbersome, often render the bushing non-reusable, and add significantly to the expense of the bushings. Additionally, it is often desirable that the bushings be manually adjustable, even after they are set initially into the wall structure. This is generally not possible with conventional bushing devices employing external locking mechanisms.

The present invention relates to an improvement in conventional threaded bushings and addresses the problems with the conventional bushings noted above.

OBJECTS AND SUMMARY OF THE INVENTION

It is therefore a principal object of the present invention to provide an improved through-wall bushing.

An additional object of the present invention is to provide a manually adjustable through-wall bushing that is manually tightenable yet is locked against untightening.

It is still a further object of the present invention to provide a bushing device with an integrally formed locking mechanism.

Additional objects and advantages of the invention will be set forth in part in the following description, or may be obvious from the description, or may be learned through practice of the invention.

In accordance with the objects and purposes of the invention, a through-wall bushing device is provided for defining a protected passage through a wall or similar structure. The bushing device according to the invention is not limited to any particular use and has obvious applications in any environment wherein a passage for cables, and the like, is provided into or out of a compartment through a wall or other defining structure. One particular application of the bushing device according to the invention is in the automotive or trucking industry wherein bushings are provided in various applications, for example for passing battery cables through a compartment or structure defining a battery well or box wherein it is particularly important to prevent the cables from being chafed or cut by the box or wall structure.

The bushing device according to the invention includes a first member having an axially extending threaded portion and defining the protected opening therethrough. This first member may be considered as the male member. A second ring member is provided having an axially extending threaded portion for threaded engagement with the threaded portion of the first member. The second ring member and first member are thereby axially adjustable along the length of the respective threaded portions. opposing flange surfaces are defined on the first member and second ring member for clamping the wall structure therebetween. The flange surfaces can be defined in any manner and can have virtually any shape.

At least one friction inducing locking mechanism is configured on the threads of at least one of the first member or second ring member threaded portions. It should be appreciated that this locking mechanism can be defined on either of the threaded portions. Alternatively, a plurality of the locking mechanisms can be defined axially spaced apart along the threaded portions on either of the first member or second ring member. The friction inducing locking mechanism is configured so that upon contact of the other threaded portion of the first member or second ring member, respectively, friction is increased between the threaded portions thereby increasing the loosening torque that is required to disengage the members.

In a preferred embodiment of the invention, the locking mechanism has a shape or configuration so as to require a greater loosening torque to disengage the members than to further tighten the members together once the locking mechanism has engaged. In other words, once the threads of the two members are acted on by the locking mechanism, the members can continue to be tightened with a tightening torque that is greater than the initial torque required to threadedly tighten the members, but which is less than the torque required to disengage the members once the locking mechanism has taken effect.

One preferred embodiment of the locking mechanism that generates the different tightening and loosening torques comprises a ramp section that is disposed in a thread groove of the respective threaded portion defining the locking mechanism. This ramp section is ramped from a low point to a high point in the tightening direction of the respective threaded portion so that the opposite thread must be moved up the ramp portion to further tighten the members together. The high spot preferably has a height of from about two-thirds (⅔) the height of the threads to about the same height of the threads. In a preferred embodiment, the ramp section is defined by an essentially vertical back wall. The back wall may also be slanted or angled to increase the locking force, as described in greater detail herein.

A flat section may be disposed adjacent to the high point of the ramp section in an alternative embodiment. Preferably, this flat section has a height the same as the high point of the ramp section. The flat section may also comprise a generally vertical end face. With this configuration, a greater torque is required to loosen the members than to tighten the members along the ramped surface of the locking mechanism.

In a preferred embodiment, the locking mechanism is formed from the same material as its respective threaded portion and is molded or formed integral therewith.

As mentioned, it may also be desired to provide a plurality of these locking mechanisms axially spaced along the respective threaded portions. The effect of the additional locking mechanisms is cumulative. Also, as one locking mechanism at a first axial location tends to wear from repeated tightening and loosening of the members, the second locking mechanism may remain unaffected and completely operable. This would be particularly true if the bushing is subsequently used with a wall structure having a thinner thickness. Thus, if all of the locking mechanisms were to become engaged with threads, the loosening and tightening torques would progressively increase as each locking mechanism is engaged. On the other hand, if the wall structure is of such a thickness that all of the locking mechanisms do not become engaged with the threads, then the bushing can be used in subsequent applications on a thinner wall structure wherein at least one of the locking mechanisms has never been engaged with the threads and is not worn or degraded in any way.

The invention will be described in greater detail below through use of the figures.

DETAILED DESCRIPTION

Figure 1:
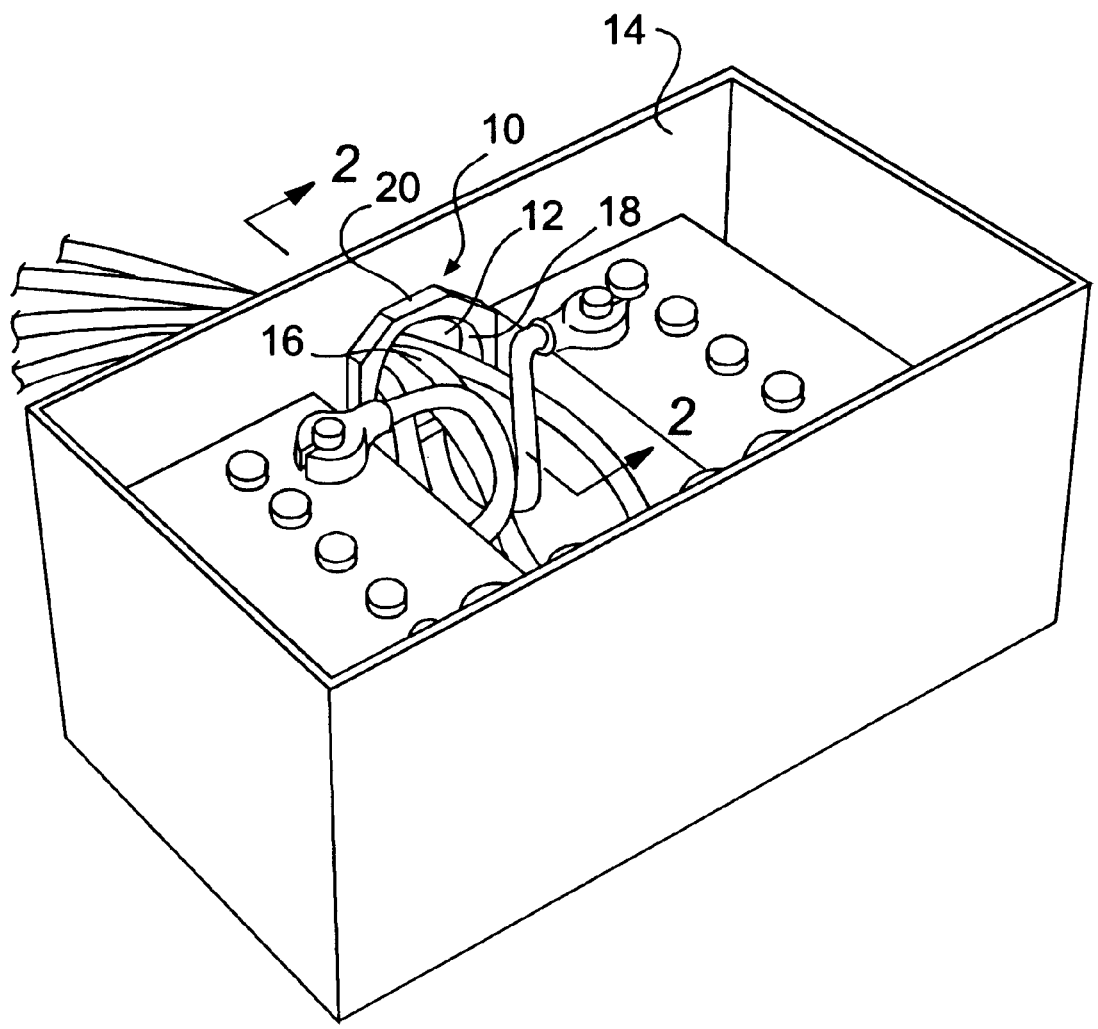
FIG. 1 is a perspective view of one embodiment of the bushing according to the invention in a typical application.

Reference will now be made in detail to the presently preferred embodiments of the invention, one or more examples of which are illustrated in the drawings. Each embodiment is provided by way of explanation of the invention, and not meant as a limitation of the invention. For example, features illustrated or described as part of one embodiment may be used on another embodiment to yield still a further embodiment. It is intended that the present invention include such modifications and variations as come within the scope and spirit of the present invention.

FIG. 1 illustrates a bushing device 10 in one conventional application as a through-wall passage in a battery well compartment. This application is illustrated as an example only and it should be appreciated that bushing device 10 has a vast number of applications and can be used in any environment.

Generally, bushing 10 includes a first member 20 that defines a protected passage or opening 12 therethrough. A smooth or machined surface 18 generally defines opening 12 so that cables 16, wires, or any other component running through opening 12 is not abraded, chafed, or otherwise damaged by the bushing device.

Bushing device 10 is disposed in an opening within wall structure 14 sized to accommodate first member 20 that extends through the opening.

It should be appreciated that the bushing device 10 of the type illustrated in the figures, with the exception of the locking mechanism to be described in greater detail below, is conventional and well known to those skilled in the art, and a detailed description thereof is not necessary for purposes of describing the present invention.

Figure 2:
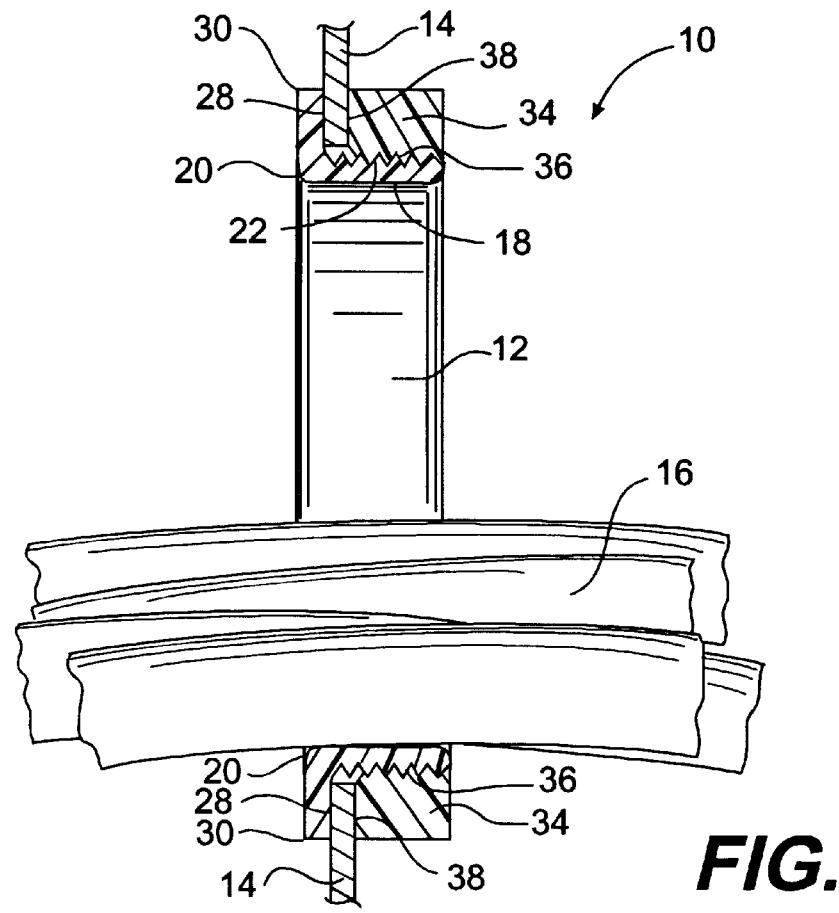
FIG. 2 is a cut-away side view of the bushing illustrated in FIG. 1.

Referring to FIG. 2, first member 20 includes an axially extending threaded portion 22. The inner circumference of the structure defining threaded portion 22 also defines opening 12 through bushing device 10. Threaded portion 22 includes threads 24 and adjacent thread grooves 26, as is commonly understood.

First member 20 also includes an annular member 30 defining a flange surface 28. Flange surface 28 can be defined by any structure on first member 20, and the embodiment illustrated is a mere example of a preferred embodiment. Annular member 30 may also include flats 32 defined thereon to aid in loosening or tightening the bushing device.

Bushing device 10 also includes a second ring member, generally 34. Ring member 34 includes an axially extending threaded portion 36 that threadedly engages with first member 20. Ring member 34 also defines a flange surface 38 for clamping against a wall surface 14. For example, referring to FIG. 2, bushing device 10 is clampingly held on wall structure 14 by tightening second ring member 34 onto first member 20 so that wall 14 is clamped between the opposing flange surfaces 28, 38.

Bushing device 10 also includes at least one friction inducing locking mechanism, generally 42. Locking mechanism 42 is configured preferably integral with the threads on either or both of threaded portions 22 and 36. In the embodiment illustrated, locking mechanism 42 is defined in thread grooves 26 between threads 24 of the axially extending threaded portion 22 of first member 20. It should be appreciated that locking mechanisms 42 could just as well be defined on the threaded portion 36 of second ring member 34.

Figure 4A:
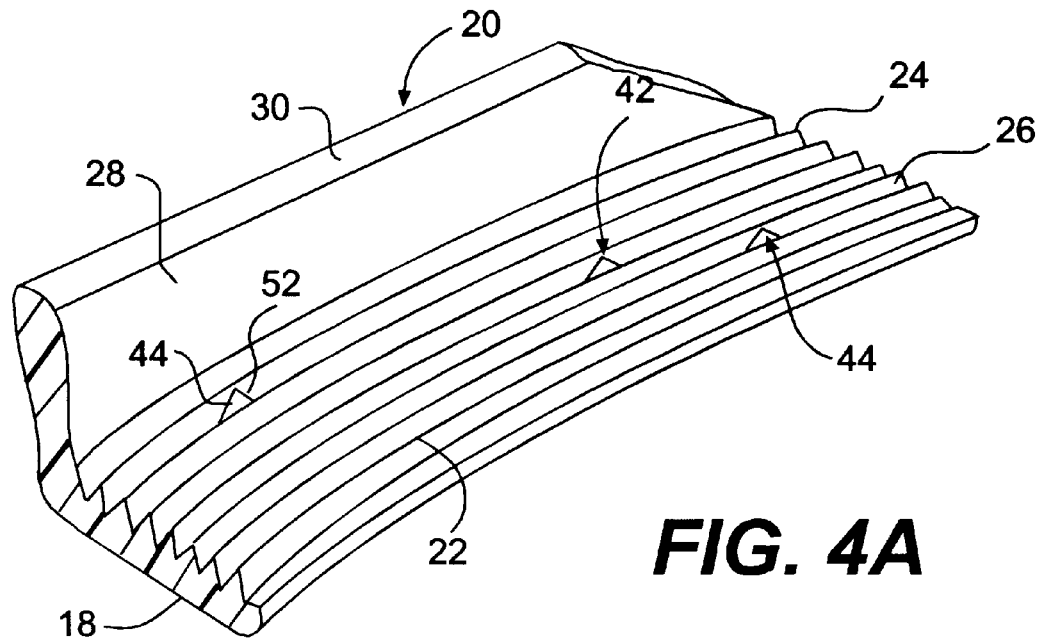
FIG. 4a is an enlarged view of a threaded portion particularly illustrating the locking mechanism.
Figure 4B:
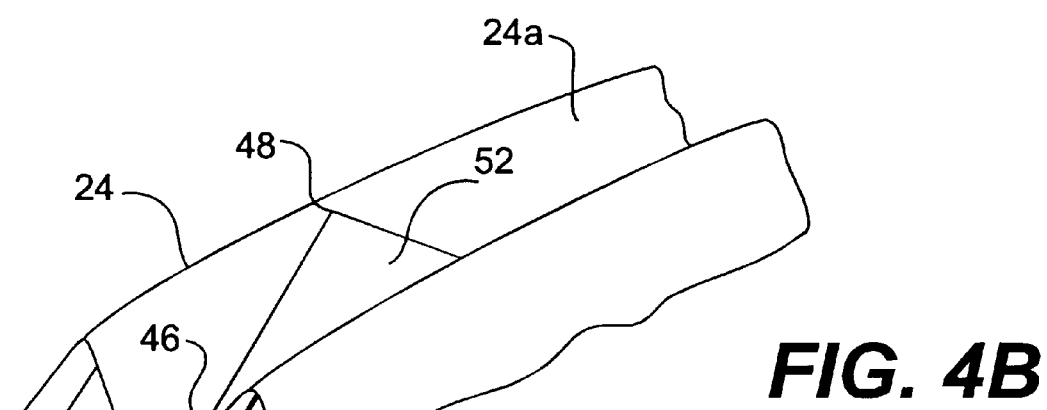
FIG. 4b is an enlarged view of one of the locking mechanisms.
Figure 4C:
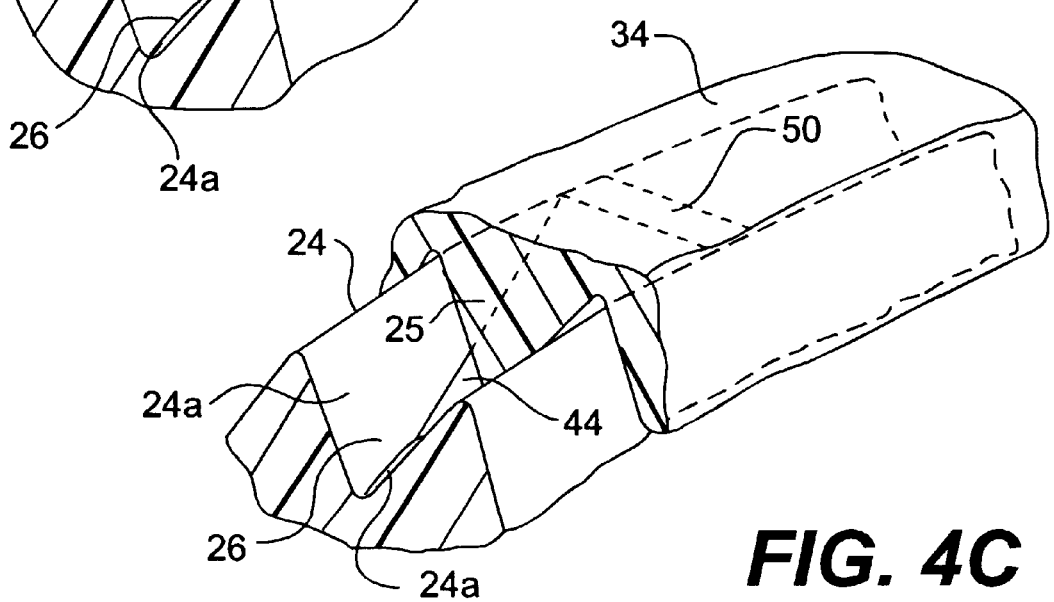
FIG. 4c is an enlarged operational view of the locking mechanism.
Figure 4D:
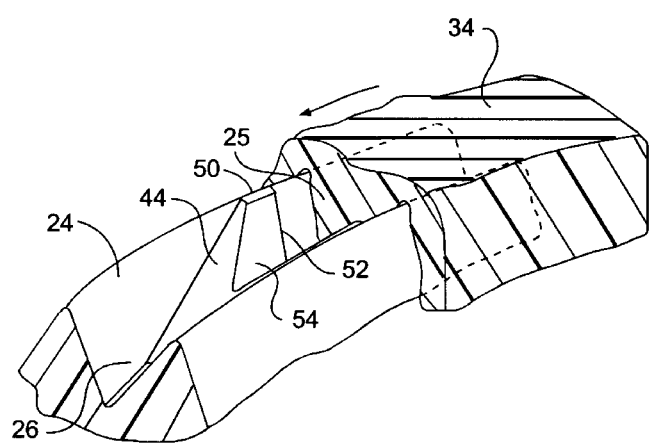
FIG. 4d is an alternative enlarged operational view of the locking mechanism.

Locking mechanisms 42 have a configuration so as to increase friction between the engaging threads of sections 22, 36 upon the threads reaching or contacting the locking mechanisms 42. For example, referring to FIGS. 4a through 4d, locking mechanism 42 may comprise an initial ramping surface 42 defined within a thread groove 26 from a low point 46 to a high point 48. Locking mechanism 44 preferably extends between flanks 24a of adjacent threads 24. High point 48 is generally between about two-thirds and at the same height as threads 24. For example, FIGS. 4a and 4b illustrate high point 48 below the height of threads 24, and FIGS. 4c and 4d show high point 48 at about the same height or flush with threads 24. Ramp section 44 is ramped from the low to high point in the tightening direction of the threads.

In a preferred embodiment shown in FIGS. 4a and 4b, an essentially vertical wall 52 is disposed immediately adjacent to high point 48. In an alternative embodiment shown in FIGS. 4c and 4d, a generally flat section 50 is defined on locking mechanism 42 adjacent to the ramp section before vertical wall 52. Flat section 50 is also generally at the height of high point 48. Although not illustrated in the figures, wall 52 may also be angled or slanted to increase the force required to loosen the threaded portions, thus increasing the locking effect of mechanism 42.

Locking mechanism 42 as configured in the drawings increases rotational friction between the first and second members 20, 34 by requiring the opposite threads to essentially move up or cut through ramp section 44 to further rotationally advance the threads. For example, referring to FIG. 3, second ring member 34 is easily threadedly advanced onto first member 20 until the initial leading thread 25 engages with the first locking mechanism 42. Referring to FIG. 4c, in order for thread 25 to rotationally advance further in the tightening direction of the arrow, thread 25 must move up ramp section 44. There is typically enough play within the threads due to machining tolerances that thread 25 is able to move up ramp portion 44 at least partially upon further tightening torque being applied to second member 34.

It is also within the scope of the invention that threads 25 may actually cut into locking mechanism 42 and define a wear cut or groove 54 through locking mechanism 42, as generally illustrated in FIG. 4d. Groove 54 will obviously be a function of the degree of play between the threads and height of ramp section 44. In this regard, it is preferred that locking mechanism 42 is defined of at least the same material as the material of threaded portions 22, 36, and not of a harder material. It is a relatively easy process to simply to co-mold locking mechanism 42 with the threaded portions, particularly when bushing device 20 is a plastic molded component.

Thus, upon second member 34 engaging or contacting one of the locking mechanisms 42, a greater degree of tightening torque is required to further tighten member 34 onto member 20.

Figure 3:
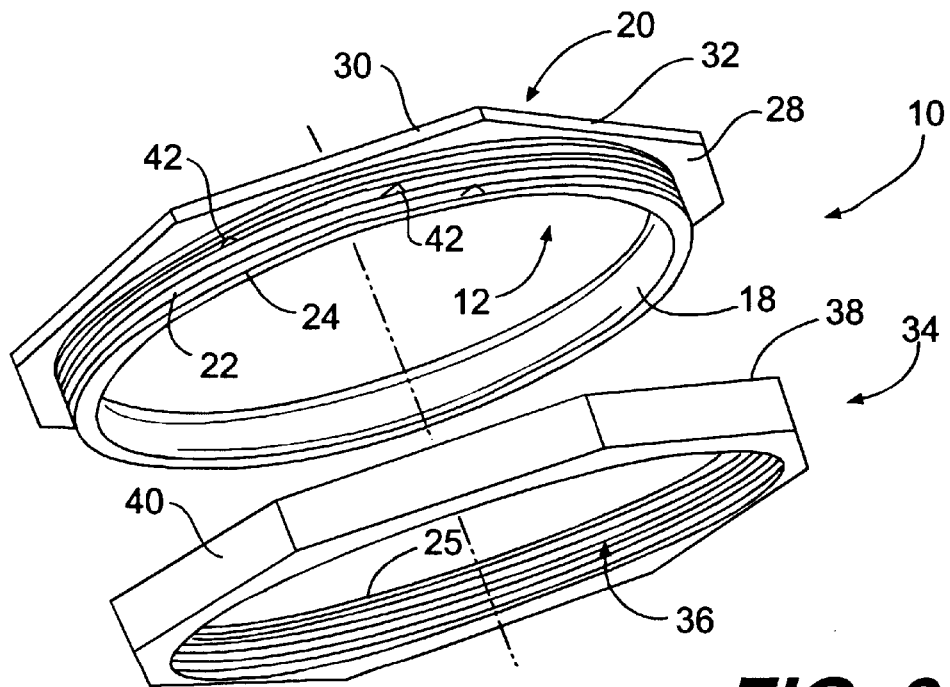
FIG. 3 is an in-line component view of the bushing.

It may be preferred to dispose a plurality of locking mechanisms 42 axially spaced apart along threaded portion 22, as particularly illustrated in FIG. 3. This may be preferred for a number of reasons. For example, if wall structure 14 is relatively thin, a relatively great degree of threaded advancement of ring member 34 along threaded portion 22 is required to clamp wall structure 14. If only one locking mechanism 42 were provided and disposed generally near the end of threaded portion 22, the locking mechanism 42 would tend to lose some of its effectiveness as more threads are engaged with the locking mechanism, which would tend to wear a groove 54, as discussed above. By providing a plurality of the locking mechanism axially spaced apart, as the threads sequentially contact the locking mechanisms 42, the effect of the locking mechanisms is cumulative.

The plurality of locking mechanisms 42 also increases the likelihood that bushing device 10 can be re-used in other applications, particularly if the bushing device is to be used in a subsequent application wherein wall structure 14 is thinner than in the initial application.

Locking mechanism 42 is also preferably configured so that once the locking mechanism engages with an opposite thread, as illustrated in FIGS. 4c and 4d, a greater loosening torque is required to subsequently loosen or disengage second member 34 from first member 20. In other words, a greater degree of torque is required to rotate second member 20 in the loosening direction due to the shape or configuration of locking mechanism 42. This feature is accomplished in the embodiment illustrated in the figures by providing vertical wall 52 against which the threads must rotate in the loosening direction. It may be desired to define flat section 50, as described above, to further increase this effect. Referring particularly to FIG. 4d, in order to rotate second ring member 34 in the loosening direction indicated by the arrow, thread 25 must essentially pass over or through locking mechanism 42 without the aid of ramped surface 44. It takes a far greater degree of torque to force threads 25 through or over the locking mechanism without the aid of a ramping section.

It should be appreciated by those skilled in the art that various modifications and variations can be made to the present invention without departing from the scope or spirit of the invention. For example, the shape and configuration of locking mechanism 42 for increasing the threaded friction between the bushing members can vary widely within the scope and spirit of the invention. All such configurations and shapes are within the scope of the invention.

What is claimed is:

1. A through-wall bushing device for providing a protected passage through a wall structure, comprising:

a first member having an axially extending threaded portion and further defining an axially extending opening therethrough;

a second ring member having an axially extending threaded portion for threaded co-axial engagement with said first member threaded portion, said first member and second ring member thereby axially adjustable along said respective threaded portions;

opposing flange surfaces defined on said first member and said second ring member, wherein said flange surfaces clamp upon a wall structure disposed therebetween; and at least one discrete friction inducing locking mechanism configured on at least a respective one of said first member threaded portion and said second ring member threaded portion, wherein upon contact of said other threaded portion friction is increased between said threaded portions thereby increasing a loosening torque required to threadedly disengage said first member and said second ring member;

said locking mechanism disposed in a thread groove of said at least one threaded portion and extending from and between opposing flanks of said threaded groove, said locking mechanism comprising a ramp section that ramps from a low point to a high point in a tightening direction of said respective threaded portion wherein upon threads of said other threaded portion engaging said locking mechanism upon tightening said first member and second ring member together, said threads are forced to move up or cut through said ramp section.

2. The bushing device as in claim 1, wherein said locking mechanism is formed of a same material as and integral with said threaded portion.

3. The bushing device as in claim 2, wherein said locking mechanism requires more of a loosening torque to disengage than to further tighten said first member and said second ring member.

4. The bushing as in claim 3, wherein said locking mechanism comprises a wall disposed adjacent to said high point of said ramp section.

5. The bushing device as in claim 4, further comprising a flat section between said high point and said wall.

6. The bushing device as in claim 4, wherein said wall comprises a generally vertical end face.

7. The bushing device as in claim 1, further comprising a plurality of said locking mechanisms axially spaced apart on said respective threaded portion.

8. A through-wall bushing device for providing a protected passage through a wall structure, comprising:

a first member having an axially extending threaded portion and further defining an opening therethrough;

a second ring member having an axially extending threaded portion for threaded co-axial engagement with said first member threaded portion, said first member and second ring member thereby axially adjustable along said respective threaded portions;

opposing flange surfaces defined on said first member and said second ring member, wherein said flange surfaces clamp upon a wall structure disposed therebetween; and at least one friction inducing locking mechanism configured on at least a respective one of said first member threaded portion and said second ring member threaded portion, wherein upon contact of other threaded portion friction is increased between said threaded portions thereby increasing a loosening torque required to threadedly disengage said first member and said second ring member, said locking mechanism formed integral on said threaded portion and having a shape so as to require more of a loosening torque to disengage than to further tighten said first member and said second ring member;

said locking mechanism disposed in a thread groove of said threaded portion and extending from and between opposing flanks of said groove comprising a ramp section disposed in said thread groove of said respective threaded portion and ramped from a low point to a high point in a tightening direction of said respective threaded portion, and a generally vertical wall disposed adjacent to said high point of said ramp section.

9. The bushing device as in claim 8, further comprising a plurality of said locking mechanisms axially spaced apart along said respective threaded portion.

10. The bushing device as in claim 8, further comprising a flat section defined between said high point and said wall.

* * * * *